(12) United States Patent
Guthals et al.

(10) Patent No.: US 11,853,299 B2
(45) Date of Patent: Dec. 26, 2023

(54) SYMMETRIC DATA CLEAN ROOM

(71) Applicant: VIDEOAMP, INC., Los Angeles, CA (US)

(72) Inventors: Austin Douglas Guthals, Gold Bar, WA (US); Christian Romano, Portland, OR (US); Jack Haocheng Wang, Henderson, NV (US); Phuc Hong Ngo, City of Orange, CA (US); Steve James Whalen, Santa Monica, CA (US); Ramzi Joseph Nasr, Cypress, CA (US)

(73) Assignee: Videoamp, Inc., Santa Monica, CA (US)

( * ) Notice: Subject to any disclaimer, the term of this patent is extended or adjusted under 35 U.S.C. 154(b) by 0 days.

(21) Appl. No.: 18/073,463

(22) Filed: Dec. 1, 2022

(65) Prior Publication Data

US 2023/0169076 A1     Jun. 1, 2023

Related U.S. Application Data

(60) Provisional application No. 63/264,785, filed on Dec. 1, 2021.

(51) Int. Cl.
*G06F 16/00* (2019.01)
*G06F 16/2453* (2019.01)
*G06F 16/242* (2019.01)
*G06F 16/14* (2019.01)

(52) U.S. Cl.
CPC ........ *G06F 16/2453* (2019.01); *G06F 16/144* (2019.01); *G06F 16/242* (2019.01)

(58) Field of Classification Search
CPC .................................................... G06F 16/144
See application file for complete search history.

(56) References Cited

U.S. PATENT DOCUMENTS

| | | |
|---|---|---|
| 7,181,438 B1 | 2/2007 | Szabo |
| 7,392,391 B2 | 6/2008 | Eibach et al. |
| 10,037,339 B1 | 7/2018 | Kleinpeter et al. |
| 10,621,164 B1 | 4/2020 | Kain |
| 10,685,407 B1 | 6/2020 | Cabrera |
| 10,950,020 B2 | 3/2021 | Du |
| 10,970,419 B1 | 4/2021 | Blum et al. |
| 11,157,944 B2 | 10/2021 | Roullier |
| 11,263,210 B2 | 3/2022 | McCray et al. |

(Continued)

FOREIGN PATENT DOCUMENTS

EP     2890084     7/2015

OTHER PUBLICATIONS

Office Action in U.S. Appl. No. 17/387,908 dated Nov. 16, 2021.

(Continued)

*Primary Examiner* — Ajith Jacob
(74) *Attorney, Agent, or Firm* — Buchalter; Jason W. Croft

(57) ABSTRACT

A method includes obtaining, at a first data provider, a first query generation request. The method also includes determining whether a first query, that is to be generated based on the first query generation request, is approved. In response to a determination that the first query, that is to be generated, is approved, the method also includes generating the first query. The method further includes sharing the generated first query with a second data provider.

23 Claims, 6 Drawing Sheets

(56) References Cited

U.S. PATENT DOCUMENTS

| | | |
|---|---|---|
| 11,301,464 B2 | 4/2022 | McCray et al. |
| 2005/0076022 A1 | 4/2005 | Wu et al. |
| 2005/0165744 A1 | 7/2005 | Taylor et al. |
| 2007/0016583 A1 | 1/2007 | Lempel et al. |
| 2007/0283425 A1 | 12/2007 | Ture et al. |
| 2010/0036884 A1 | 2/2010 | Brown |
| 2011/0202774 A1 | 8/2011 | Kratsch |
| 2012/0084666 A1 | 4/2012 | Hickman |
| 2012/0131075 A1 | 5/2012 | Mawdsley |
| 2013/0204886 A1 | 8/2013 | Faith et al. |
| 2013/0290234 A1 | 10/2013 | Harris et al. |
| 2014/0059012 A1 | 2/2014 | Malhotra et al. |
| 2014/0365363 A1 | 12/2014 | Knudsen et al. |
| 2015/0081562 A1 | 3/2015 | Roullier et al. |
| 2015/0081918 A1 | 3/2015 | Nowack |
| 2015/0326627 A1 | 11/2015 | Merrifield et al. |
| 2016/0050272 A1 | 2/2016 | Raduchel |
| 2017/0026343 A1 | 1/2017 | Wardman |
| 2017/0139965 A1 | 5/2017 | Marquardt et al. |
| 2017/0289191 A1 | 10/2017 | Thioux et al. |
| 2018/0082237 A1 | 3/2018 | Nagel et al. |
| 2018/0113866 A1 | 4/2018 | Bendersky et al. |
| 2018/0157794 A1 | 6/2018 | Fusi et al. |
| 2018/0276213 A1 | 9/2018 | Ramamurthy et al. |
| 2018/0336543 A1 | 11/2018 | Van Os et al. |
| 2019/0026709 A1 | 1/2019 | Baron |
| 2019/0087835 A1 | 3/2019 | Schwed et al. |
| 2019/0147076 A1 | 5/2019 | Yang et al. |
| 2019/0147451 A1 | 5/2019 | Deutschmann et al. |
| 2019/0243921 A1 | 8/2019 | Long et al. |
| 2019/0362083 A1 | 11/2019 | Ortiz et al. |
| 2019/0362101 A1 | 11/2019 | Fisse et al. |
| 2020/0067933 A1 | 2/2020 | Kukreja et al. |
| 2020/0244626 A1 | 7/2020 | Kwon et al. |
| 2020/0379995 A1 | 12/2020 | Rajaperumal et al. |
| 2021/0004782 A1 | 1/2021 | Toutain et al. |
| 2021/0099502 A1 | 4/2021 | Stern et al. |
| 2021/0133196 A1* | 5/2021 | Gladwin ............... G06F 16/252 |
| 2021/0150269 A1 | 5/2021 | Choudhury et al. |
| 2021/0210168 A1 | 7/2021 | Fusi et al. |
| 2021/0216537 A1 | 7/2021 | McCray et al. |
| 2021/0357393 A1 | 11/2021 | McCray et al. |
| 2021/0357394 A1 | 11/2021 | McCray et al. |
| 2021/0357395 A1 | 11/2021 | McCray et al. |

OTHER PUBLICATIONS

International Search Report and Written Opinion for PCT/US2021/013484 dated Apr. 22, 2021.
Office Action in U.S. Appl. No. 17/387,908 dated Aug. 4, 2022.
Office Action in U.S. Appl. No. 16/742,721 dated Sep. 17, 2021.
Office Action in U.S. Appl. No. 17/387,908 dated Nov. 23, 2022.
Office Action in U.S. Appl. No. 17/387,908 dated Apr. 15, 2022.
Office Action in U.S. Appl. No. 17/383,333 dated Sep. 21, 2022.
International Search Report and Written Opinion in PCT/US2022/051579 dated Mar. 24, 2023.

* cited by examiner

SYMMETRIC DATA CLEAN ROOM

CROSS REFERENCE TO RELATED APPLICATIONS

This U.S. patent application claims priority to Provisional Patent Application 63/264,785 filed on Dec. 1, 2021. The disclosure of this prior application is considered part of the disclosure of this application and is hereby incorporated by reference in its entirety.

TECHNICAL FIELD

This disclosure relates to the field of electronic multi-tenant data management systems, data aggregation and data mining.

BACKGROUND

Unless otherwise indicated herein, the materials described herein are not prior art to the claims in the present application and are not admitted to be prior art by inclusion in this section.

Currently, managing data from multiple data providers presents a variety of problems including privacy requirements, regulatory and legal requirements, and resolution issues, making operations involving electronic multi-tenant data difficult.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

One aspect of the disclosure provides a method including obtaining, at a first data provider, a first query generation request. The method includes determining whether a first query, that is to be generated based on the first query generation request, is approved. In response to a determination that the first query, that is to be generated, is approved, the method includes generating the first query. The method also includes sharing the generated first query with a second data provider. The first query is executable on a first data corpus from the first data provider and a second data corpus from the second data provider.

Implementations of the disclosure may include one or more of the following optional features. In some implementations, the method includes obtaining, at the second data provider, a second query generation request. In some implementations, the method includes determining whether a second query, that is to be generated based on the second query generation request, is approved. In some implementations, in response to a determination that the second query, that is to be generated, is approved, the method includes generating the second query. In some implementations, the method includes sharing the generated second query with the first data provider. In some implementations, the second query is executable on the first data corpus from the first data provider and the second data corpus from the second data provider.

In some implementations, in response to a determination that the first query, that is to be generated, is un-approved, the method includes submitting the first query generation request for an approval. In some implementations, in response to a determination that the second query, that is to be generated, is un-approved, the method includes submitting the second query generation request for an approval.

In some implementations, the method includes obtaining, at the first data provider, a request to execute the first query. In some implementations, in response to obtaining the request to execute the first query, the method includes executing the first query on the second data corpus from the second data provider, the executed first query at the second data provider. In some implementations, the method includes obtaining, at the second data provider, a request to execute the second query. In some implementations, in response to obtaining the request to execute the second query, the method includes executing the second query on the first data corpus from the first data provider, the executed second query at the first data provider.

In some implementations, the method includes obtaining, at the second data provider, a request to execute the first query. In some implementations, in response to obtaining the request to execute the first query, the method includes executing the first query on the first data corpus from the first data provider. In some implementations, the method includes obtaining, at the first data provider, a request to execute the second query. In some implementations, in response to obtaining the request to execute the second query, the method includes executing the second query on the second data corpus from the second data provider.

In some implementations, the method includes identifying a first queue, from a set of queues, to write the query. In some implementations, the method includes writing the first query to the first queue. In some implementations, the set of queues resides in a private space of the first data provider. In some implementations, generating the first query includes encapsulating the first query with a set of input parameter. In some implementations, sharing the first query with the second data provider includes installing, a first module at the second data provider, the first module including the first query. In some implementations, the first query includes an operation instruction or a set of operation instructions performable on the first data corpus and the second data corpus.

Another aspect of the disclosure provides a system. The system includes one or more processors (e.g., data processing hardware) and one or more computer-readable media (e.g., memory hardware) configured to store instructions that in response to being executed by the one or more processors cause the system to perform operations. The operations include obtaining, at a first data provider, a first query generation request. The operations include determining whether a first query, that is to be generated based on the first query generation request, is approved. In response to a determination that the first query, that is to be generated, is approved, the operations include generating the first query. The operations also include sharing the generated first query with a second data provider. The first query is executable on a first data corpus from the first data provider and a second data corpus from the second data provider.

Implementations of the disclosure may include one or more of the following optional features. In some implementations, the operations include obtaining, at the second data provider, a second query generation request. In some implementations, the operations include determining whether a second query, that is to be generated based on the second query generation request, is approved. In some implementations, in response to a determination that the second query, that is to be generated, is approved, the operations include generating the second query. In some implementations, the operations include sharing the generated second query with
} the first data provider. In some implementations, the second query is executable on the first data corpus from the first data provider and the second data corpus from the second data provider.

In some implementations, in response to a determination that the first query, that is to be generated, is un-approved, the operations include submitting the first query generation request for an approval. In some implementations, in response to a determination that the second query, that is to be generated, is un-approved, the operations include submitting the second query generation request for an approval.

In some implementations, the operations include obtaining, at the first data provider, a request to execute the first query. In some implementations, in response to obtaining the request to execute the first query, the operations include executing the first query on the second data corpus from the second data provider, the executed first query at the second data provider. In some implementations, the operations include obtaining, at the second data provider, a request to execute the second query. In some implementations, in response to obtaining the request to execute the second query, the operations include executing the second query on the first data corpus from the first data provider, the executed second query at the first data provider.

In some implementations, the operations include obtaining, at the second data provider, a request to execute the first query. In some implementations, in response to obtaining the request to execute the first query, the operations include executing the first query on the first data corpus from the first data provider. In some implementations, the operations includes obtaining, at the first data provider, a request to execute the second query. In some implementations, in response to obtaining the request to execute the second query, the operations include executing the second query on the second data corpus from the second data provider.

In some implementations, the operations include identifying a first queue, from a set of queues, to write the query. In some implementations, the operations include writing the first query to the first queue. In some implementations, the set of queues resides in a private space of the first data provider. In some implementations, generating the first query includes encapsulating the first query with a set of input parameter. In some implementations, sharing the first query with the second data provider includes installing, a first module at the second data provider, the first module including the first query. In some implementations, the first query includes an operation instruction or a set of operation instructions performable on the first data corpus and the second data corpus.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 11,301,464 B2 issued Apr. 12, 2022, to McCray et al.;

U.S. Pat. No. 10,085,073 B2 issued Sep. 25, 2018, to Ray et al.;

U.S. 2021/0357393 A1 published Nov. 18, 2021, to McCray et al.;

U.S. 2021/0357394 A1 published Nov. 18, 2021, to McCray et al.; and

U.S. 2021/0357395 A1 published Nov. 18, 2021, to McCray et al.

DESCRIPTION OF DRAWINGS

Example implementations will be described and explained with additional specificity and detail through the use of the accompanying drawings in which.

Like reference symbols in the various drawings indicate like elements.

DETAILED DESCRIPTION

Figure 1:
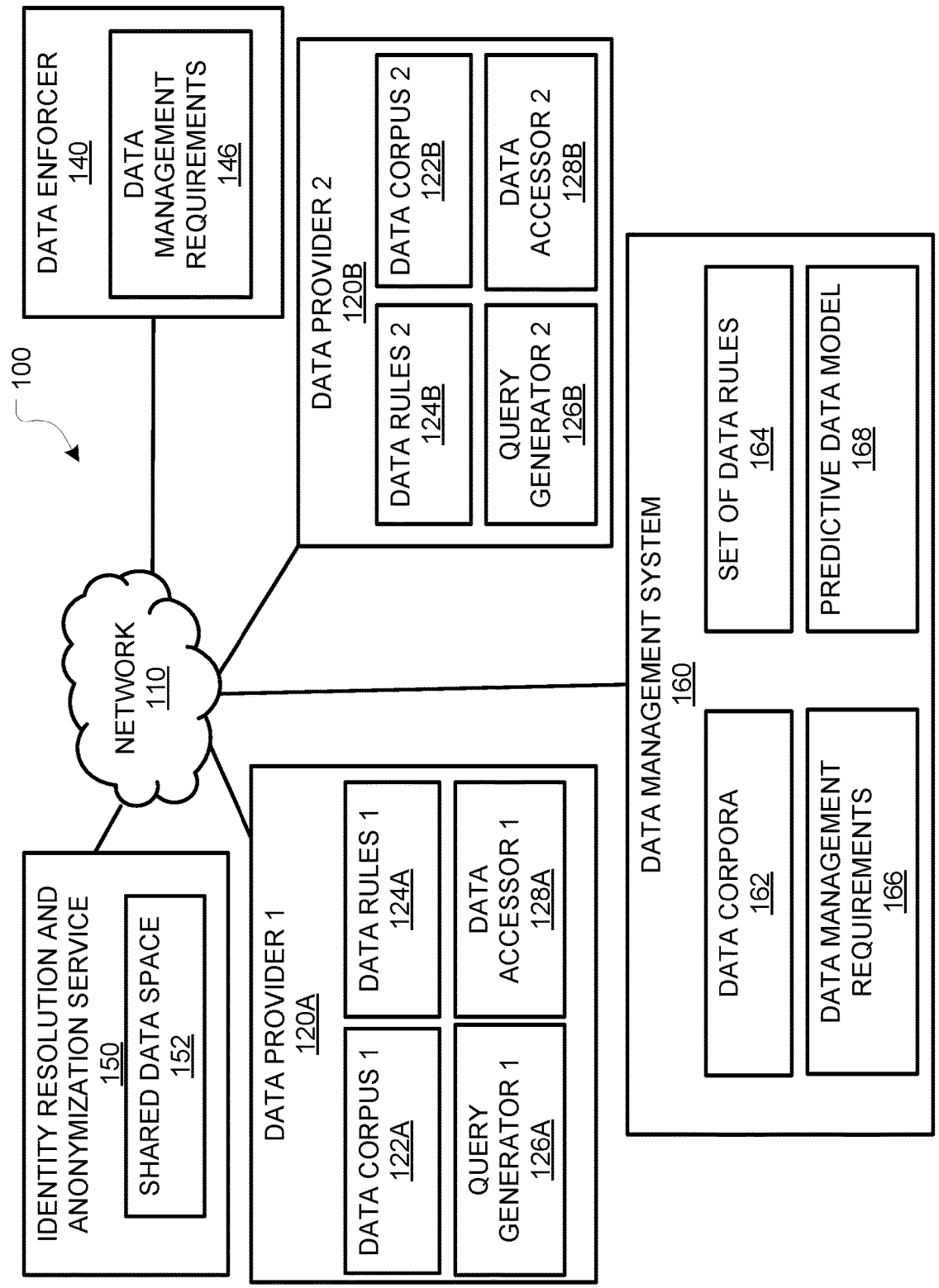
FIG. 1 illustrates an example environment related to an electronic multi-tenant data management system in accordance with some implementations of this disclosure.

The following disclosure sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Users generate data across a variety of platforms. Each of these platforms may obtain data relative to particular habits and/or activities of users. For example, web-based shopping sites may obtain a shopping history of a user, a purchase history of a user, a search history of a user, browsing history of a user, and other information. A video streaming service may have a viewing history of a user, a search history of a user, customer ratings submitted by the user, and other information. A social media site may have a list of topics, pages, and/or companies that a user has "liked", subjects and content of posts by a user, a list of topics, pages, and/or companies that a user has "followed", comments submitted by a user, and other information. In today's digital age, users may interact with multiple platforms and services each day. The multiple platforms and services are typically owned and operated by different entities that do not share their data with others. It may be beneficial for companies to be able to search data from multiple different sources to identify a more full picture of user activity, identify trends for a user and among multiple users, improve the targeting of advertising for individuals, and/or measure how successful advertising campaigns are, among others.

However, searching and analyzing data across different companies, platforms, and services may be difficult and/or impossible for a variety of reasons. If user data is not hidden, encrypted or anonymized, companies may be hesitant to share their own data with competitors, particular when the data may help competitors target the companies' customers. For example, a social media site may have little incentive to share its collection of data about users with a video streaming company or a web-based shopping site. Additionally, legal restrictions, including privacy regulations, may regulate the dissemination or use of personally identifying information, preventing one company from sharing information it gathers with other companies.

Aspects of the present disclosure address these and other shortcomings of prior systems by improving the sharing of data across computing systems. The present disclosure provides an electronic multi-tenant data management system that entities can use to cross-share data among other entities, while still maintaining privacy of user information and company proprietary information. Using the electronic multi-tenant data management system, entities can have access to a more full set of data about a user and/or a set of users. This increased access may enable the companies to provide better electronic data services, such as advertising, to users. Additionally, electronic multi-tenant data management systems may facilitate the verification of compliance with regulatory restrictions on the sharing and use of information.

FIG. 1 illustrates an example environment 100 in accordance with some implementations of this disclosure. In some implementations, the environment 100 includes a network 110, a data provider 1 120A, a data provider 2 120B (collectively the data providers 120), a data enforcer 140, an identity resolution and anonymization service 150, and a data management system 160. In some implementations, the data provider 1 120A and the data provider 2 120B have a symmetric relationship that allows to obtain all or some of data from each other. In some implementations, the data provider 1 120A is configured to generate a first instruction or a set of instructions (e.g., query instruction, search instruction, analysis instruction such as logical analysis instruction and statistical analysis instruction, calculation instruction, instruction of retrieving a subset of data, instruction of modifying database table and/or index structure, instruction of adding, updating and/or deleting row of data, any combination thereof) that performs various operations on data (e.g., data corpus 1 122A, data corpus 122B) to obtain desire data or outcome (e.g., adding additional data to own data, obtaining statistical analysis data). In some implementations, the first instruction (also referred as "query" or "query function") is written using a suitable computer language (e.g., C, C++, Java, Python, SQL). Similar, in some implementations, the data provider 2 120B is configured to generate a second instruction or a set of second instructions (e.g., query instruction, search instruction, analysis instruction such as logical analysis instruction and statistical analysis instruction, calculation instruction, instruction of retrieving a subset of data, instruction of modifying database table and/or index structure, instruction of adding, updating and/or deleting row of data, any combination thereof) that performs various operations on data (e.g., data corpus 1 122A, data corpus 122B) to obtain desire data or outcome (e.g., adding additional data to own data, obtaining statistical analysis data). In some implementations, the second instruction or the set of second instructions (also referred as "query" or "query function") is written using a suitable computer language (e.g., C, C++, Java, Python, SQL)

In some implementations, the network 110 includes a public network (e.g., the Internet), a private network (e.g., a local area network (LAN) or a wide area network (WAN)), a wired network (e.g., an Ethernet network), a wireless network (e.g., an 802.11 network, Bluetooth network, or a Wi-Fi network), a cellular network (e.g., a Long Term Evolution (LTE) or LTE-Advanced network), routers, hubs, switches, server computers, and/or a combination thereof.

In some implementations, each of the data providers 120, the data enforcer 140, the identity resolution and anonymization service 150, and the data management system 160 is or includes a computing device such as a personal computer (PC), a laptop, a server, a mobile phone, a smart phone, a tablet computer, a netbook computer, an e-reader, a personal digital assistant (PDA), or a cellular phone etc.

Although FIG. 1 depicts two data providers 120, in some implementations, the environment 100 includes any number of data providers 120. In some implementations, the data providers 120 are associated with different entities that generate and/or obtain data associated with users. For example, the data providers 120 may be associated with video streaming companies, web-based shopping companies, social media companies, search engines, e-commerce companies, and/or other any other type of company. For example, the data provider 1 120A may be associated with a video streaming company and/or platform, the data provider 2 120B may be associated with a web-based auction company.

In some implementations, each of the data providers 120 is configured to obtain data associated with users of services provided by the data providers 120. Continuing the above example, the data provider 1 120A may obtain data associated with a variety of customers as the data corpus 1 122A. The data corpus 1 122A may include user names, user ids, emails, hashed emails, addresses, billing information, user preferences, user settings, user search histories, user viewing histories, user ratings, etc. For example, the data corpus 1 122A may include a listing of each video streamed by each user together with a time when each video was streamed, a location where each video was streamed, a number of times each video was streamed, any ratings submitted by a user associated with any videos streamed by the user, searches performed by the user, internet-based activities made by the user, electronic activities made by the user, purchases made by the user, language settings of the user including subtitles, captions, language tracks, and other data of the user. In some implementations, the data corpus 1 122A correlates data with particular users based on a user's name, user identification, email address, billing information, etc.

Similarly, the data provider 2 120B may obtain data associated with a variety of customers as the data corpus 2 122B. The data corpus 2 122B may include similar data as the data corpus 1 122A but may be associated with, in this example, a web-based auction company. For example, the data corpus 2 122B may include a listing of each auction that is being tracked by each user, each bid and purchase made by each user, product ratings submitted by each user relative to purchases made by the user, buyer and/or seller ratings associated with each user, searches performed by each user, items each user has listed for sale, a user's physical location, etc. In some implementations, the data corpus 2 122B correlates data with particular users based on a user's name, user identification, email address, billing information, etc.

In some implementations, the data corpora 122 additionally include other information such as, for example, tracked locations of user input (e.g., tracking where a user clicks, where a user moves a mouse, where a user drags a finger on a touchscreen), tracked keystrokes of users, tracked eye movement and eye focus of users, advertisements that are visited by each user, purchase and return history for each user, location of users, demographic information about users such as the users age, ethnicity, education level, income level, gender, etc. and other user data.

In situations in which the systems discussed here collect personal information about users, or may make use of personal information, the users may be provided with an opportunity to control whether programs or features collect user information (e.g., information about a user's social network, social actions, interactions or activities, profession, a user's preferences, a user's viewing history, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In some implementations, the data corpora 122 are shared, on a full or limited basis, to the data management system 160. Each of the data providers 120 may also include corresponding data rules 124 that dictate how the respective data corpus 122 may be shared, used, access, etc. by other data providers 120 that can access the data management system. 160. For example, the data provider 1 120A may include data rules 1 124A, and the data provider 2 120B may include data rules 2 124B. The data rules 124 may include restrictions on access to the data corpora 122. For example, the data rules 1 124A may include rules established by the data provider 1 120A for accessing the data corpus 1 122A. The data rules 1 124A may include a list of individuals, corporations, and/or entities who may access the data corpus 1 122A via the data management system 160. Additionally or alternatively, in some implementations, the data rules 1 124A includes a permission list which may grant different individuals, corporations, and/or entities different levels of access to the data corpus 1 122A. For example, a first entity may have full access while a second entity may only have access to a subset of the data corpus 1 122A. In addition, data rules 124 may include a list of data providers 120, the type of data from each data provider 120 that can be correlated with data corpus 122, and/or and a particular permitted purpose or non-permitted purpose. In some implementations, the data rules 124 include a list of queries (e.g., query functions generated by a query generator 126) that are permitted (or approved) to have access to the data corpus 122. In some implementations, the data rules 124 determines whether a query (e.g., query function generated by a query generator 126) is approved.

In some implementations, the data rules 1 124A also includes privacy requirements. For example, the privacy requirements may include a requirement for a minimum number of user data to be disclosed in response to a search query such as a minimum bin aggregation rule. For example, the minimum bin aggregation may be 100 users. The user data may be shared on an individual basis, or the user data may be aggregated. If a search results in fewer than 100 results, the search results of the data corpus 1 122A may not be disclosed as the number of search results may not satisfy the minimum bin aggregation rule. Additionally or alternatively, if the search results in fewer than 100 results, the search results of the data corpus 1 122A may not be aggregated and the aggregated data may not be shared. In some implementations, user data that is shared is anonymized and personally identifiable user information is removed and/or hidden from being identified by data providers other than the data provider that is sharing the data. In some implementations, search results need to satisfy multiple data rules 124 such as the data rules 1 124A and the data rules 2 124B. In some implementations, the data rules 1 124A includes a first minimum bin aggregation rule and the data rules 2 124B includes a second minimum bin aggregation rule. If the first minimum bin aggregation rule is stricter (i.e., greater) than the second minimum bin aggregation rule, the search results may only need to satisfy the first minimum bin aggregation rule. Alternately, in some implementations, if the minimum bin aggregation is 100, for example, and the search results are fewer than 100 results, a catch all bin may be used to report on all metrics that did not meet the minimum bin aggregation rule. This catch all bin can either be separate for each data provider rule or a single bin for all data provider rules at the strictest (greatest) rule. In addition the catch-all bin may or may not expose the pertinent metadata in the search to satisfy various privacy requirements (e.g., a differential privacy requirement).

In some implementations, the data rules 1 124A also includes data transformation rules. For example, the data transformation rules may include a requirement for grouping of search results into bins. For example, in response to a search query, results from the data corpus 1 122A may be grouped into bins of a particular size and/or the number of search results may be rounded to the nearest bin size. When the bin size is 30, the results may be rounded to the nearest 30. Alternatively or additionally, in some implementations, data transformations include fuzzing of data. For example, rather than providing exact values for data included in the data corpus 1 122A, the data management system 160 may provide the values of the data modified by a relatively small random amount, or data that has been aggregated. In addition, each data provider 120 may include its own confidential data fuzzing rules so that it can account for fuzzing of its own data when the same entity is also the data accessor. For example, using these fuzzing rules, the data provider 1 120A may filter out their own data from any results to provide different data resolution to own data accessor 1 128A.

In some implementations, the data rules 2 124B operates similar to the data rules 1 124A described above.

In some implementations, each of the data providers 120 provides its corresponding data corpus 122 and data rules 124 to the data management system 160 and may be subject to the respective data rules 124. Provider-specific data rules may include user-base size estimate protections. For example, data providers may consider a logged-in user count to be material nonpublic information. The data management system 160 can allow data providers 120 to introduce sampling, fuzzing, sketch, or a probabilistic privacy preserving population estimate to protect the true size estimate of the data provider logged in user base. Any sampling may be verified by cleanroom partners (e.g., any data provider 120 that may contribute to the shared data space 152) to conform to any pre-existing conditions for down-sampling, preventing bias, or non-random noise.

In some implementations, as shown in FIG. 1, the environment 100 includes query generators 126 (e.g., query generator 1 126A, query generator 2 126B). As shown, in some implementations, the data provider 1 120A includes a query generator 1 126A (which is configured to generate the first instruction or the set of first instructions), and the data provider 2 120B includes a query generator 2 126B (which is configured to generate the second instruction or the set of second instructions). In some implementations, each of the query generators 126 (e.g., query function generators) is configured to obtain a query generation request (e.g., query function generation request) and is configured to generate a query (e.g., query function) that is configured to be executed on the data corpora 122 based on the query generation request. For example, in response to obtaining a query generation request (from a user of the data provider 1 120A in this example) that calls for generating a query (e.g., query function) that is executable on the data corpus 1 122A (of the data provider 1 120A) and the data corpus 2 122B (of the data provider 2 120B), the query generator 1 126A determines whether the query (e.g., query function) requested to be generated is approved or allowed by all of the data providers 120 associated with the data corpora 122 that the query is configured to be executed on (data provider 1 120A and data provider 2 120B in this example). In some implementations, the query generator 1 126A determines whether the query to be generated is approved or allowed based on data rules 1 124A of the data provider 1 120A and data rules 2 124B of the data provider 2 120B. For example, the query (e.g., query function) to be generated may not be approved by the data rules 2 124B of the data provider 2 120B when the query to be generated needs an access to a subset of the data corpus 2 122B which is set as un-shareable in the data rules 2 124B.

In some implementations, in response to a determination that the query (e.g., query function) to be generated is approved by all of the relevant data providers 120 (data provider 1 120A and data provider 2 120B in this example), the query generator 1 126A generates the query (e.g., query function). In some implementations, the query generator 1 126A installs the generated query to the data provider 1 120A. In some implementations, the query (e.g., query function) is installed as a query module (e.g., module including the query or query in a module format) to the data provider 1 120A. When the query (e.g., query function) is installed as the query module, the query and an execution engine (e.g., operating system of clean room system) that is configured to execute the query (e.g., query function) can be separately maintained. For example, the execution engine (e.g., operating system of clean room system) and the installed query module can be separately updated. In other words, the execution engine (e.g., operating system of clean room system) can be versioned separately from the query module.

In some implementations, the query generator 1 126A shares the generated query (and/or information about the generated query) with the data provider 2 120B and/or data management system 160. In some implementations, as a result, the query generator 1 126A installs the query to the data provider 2 120B. In some implementations, as a result, the query generator 1 126A installs the query to the data management system 160. In some implementations, as a result, the data rules 124 (data rules 2 124B in this example) includes the query in a list of an approved queries (e.g., query function). In some implementations, as a result, the query (e.g., query function) is installed as a query module (e.g., module including the query or query in a module format) to the data provider 2 120B. As discussed, when the query (e.g., query function) is installed as the query module, the query module and an execution engine (e.g., operating system of clean room system) that is configured to execute the query (e.g., query function) can be separately maintained. For example, the execution engine (e.g., operating system of clean room system) and the installed query module can be separately updated. In other words, the execution engine (e.g., operating system of clean room system) can be versioned separately from the query module.

In some implementations, in response to a determination that the query (e.g., query function) to be generated is not approved by all of the relevant data providers 120 (data provider 1 120A and data provider 2 120B in this example), the query generator 1 126A requests the approval to the data provider 120 which did not approve the query generation request (data provider 2 120B in this example). In some implementations, upon receiving the approval request, the owner (or person in charge of data privacy) of the data corpus 2 122B considers the request and updates the data rules 2 124B when the owner (or person in charge of data privacy) of thee data corpus 2 122B determines that the subset of the data corpus 2 122B previously determined as un-sharable data is determined as shareable with other (the subset of data 2 122B sharable with the user of the data provider 1 120A in this example). As discussed, in some implementations, in response to a determination that the query to be generated is approved by all of the relevant data providers 120 (data provider 1 120A and data provider 2 120B in this example), the query generator 1 126A generates, installs and/or shares the query (e.g., query function) as discussed above.

In some implementations, in response to a determination that the query (e.g., query function) to be generated is not approved or allowable by all of the relevant data providers 120 (data provider 1 120A and data provider 2 120B in this example), the query generator 1 126A still generates, installs, and/or shares the query (e.g., query function). However, the un-approved query (e.g., un-approved query function) is not executable until receiving the approval from all of the relevant data providers 120 (data provider 1 120A and data provider 2 120B in this example). In some implementations, the query generator 1 126A keeps request the approval until receiving the approval from all of the relevant data providers 120. In some implementations, upon receiving the approval from all of the relevant data providers 120, the query generator 1 126A enables the un-approved query (e.g., un-approved query function) so the un-approved query is executable.

In some implementations, as shown in FIG. 1, the environment 100 includes data accessors 128 (e.g., data accessor 1 128A, data accessor 2 128B). As shown, in some implementations, the data provider 1 120A includes a data accessor 1 128A, and the data provider 2 120B includes a data accessor 2 128B. In some implementations, the data accessors 128 may be granted permission to perform searches of one or more the data corpora 122 via the data management system 160. In some implementations, the data accessor 1 128A is listed as a party that may access the data corpus 122B subject to the data rules 2 124B. Similarly, in some implementations, the data accessor 2 128B is listed as a party that may access the data corpus 122A subject to the data rules 1 124A. For example, the data rules 1 124A and data rules 2 124B may list the data accessor 1 128A and the data accessor 2 128B that may perform searches of the data corpus 1 122A and the data corpus 2 122B. In some implementations, the data rules 1 124A limits the data accessor 2 128B from accessing certain subset of the data corpus 1 124A. Similarly, in some implementations, the data rules 2 124B limits the data accessor 1 128A from accessing certain subset of the data corpus 2 124B.

In some implementations, the data accessors 128 may be granted permission to perform searches of one or more the data corpora 122 by executing the query (e.g., query function) (generated by the query generators 126) on the one or more the data corpora 122. In some implementations, the data accessors 128 are configured to obtain or receive a request to execute the query (e.g., query function) generated by the query generators 126 on the data corpora 122. In some implementations, the data accessor 1 128A is configured to obtain or receive a request by a user (e.g., same user who requested the query generation request) to execute the query (query function executable on the data corpus 1 122A (of the data provider 1 120A) and the data corpus 2 122B (of the data provider 2 120B) in this example). In some implementations, in response to obtaining the request to execute the query (e.g., query function), the data accessor 1 128A executes the query on the data corpus 1 122A and the data corpus 2 122B so that a desire data can be obtained by correlating the data corpus 1 122A with the data corpus 2 122B.

In some implementations, the data accessor 1 128A executes the query installed at the data provider 1 120A. In some implementations, the data accessor 1 128A executes the query installed at the data provider 2 120B. In some implementations, the data accessor 1 128A executes the queries installed at the data provider 1 120A and the data provider 2 120B together. In some implementations, the data accessor 1 128A executes the query at the data management system 160. As a result, the user of the data provider 1 120A is able to obtain desire data (e.g., statistical data, data that can improve own data, data corpus 1 122A). For example, by executing the query (e.g., query function), the data corpus 1 122A in the data provider 1 120A can be improved using overlapping customer data between the data corpus 1 122A and the data corpus 2 122B. In this example, the user of the data provider 1 120A (video streaming company in this example) can be able to determine how many of their customers are also customers of the web-based action company associated with the data provider 2 120B. Based on the statistical data, the video streaming company may offer own video streaming based action channel. In other example, based on the overlapping customer data, the user of the data provider 1 120A (video streaming company in this example) can be able to obtain video titles purchased by own customers via the web-based action company and use the data to determine new video titles to offer to its customers.

In some implementations, the data accessor 2 128B is configured to obtain or receive a request by a user (e.g., user of the data provider 2 120B) to execute the query (query function executable on the data corpus 1 122A (of the data provider 1 120A) and the data corpus 2 122B (of the data provider 2 120B) in this example). In some implementations, in response to obtaining the request to execute the query (e.g., query function), the data accessor 2 128B executes the query on the data corpus 1 122A and the data corpus 2 122B so that a desire data can be obtained by correlating the data corpus 1 122A with the data corpus 2 122B.

In some implementations, the data accessor 2 128B executes the query installed at the data provider 1 120A. In some implementations, the data accessor 2 128B executes the query installed at the data provider 2 120B. In some implementations, the data accessor 2 128B executes the queries installed at the data provider 1 120A and the data provider 2 120B together. In some implementations, the data accessor 2 128B executes the query at the data management system 160. As a result, the user of the data provider 2 120B is able to obtain desire data (e.g., statistical data, data that can improve own data, data corpus 2 122B). For example, by executing the query (e.g., query function), the data corpus 2 122B in the data provider 2 120B can be improved using overlapping customer data between the data corpus 1 122A and the data corpus 2 122B.

The data enforcer 140 may be associated with a third-party such as, for example, a government entity. For example, the data enforcer 140 may be associated with a regulatory body that works to ensure that data gathered by the data providers 120 and accessed by the data providers 120 (e.g., accessors 128) conform to data management requirements 146. For example, in some jurisdictions, the data management requirements 146 may not permit the gathering of data from minors without consent. Alternatively, in some implementations, the data management requirements 146 may not permit targeted advertising to minors or to others. Additionally or alternatively, in some jurisdictions, data management requirements 146 may not permit the dissemination of personally identifying information by the party that gathered it to other parties. For example, in some jurisdictions, the data management requirements 146 may allow the data provider 1 120A to gather personally identifying information for use in billing, providing services, etc. but may not allow the data provider 1 120A to sell or distribute that data to other parties. The data enforcer 140 may use the data management system 160 to verify compliance with the data management requirements 146. Alternatively, the data enforcer 140 may be operated and/or managed by the data management system 160, the identity resolution and anonymization service 150. The data enforcer 140 may include a correlation of rules from the data provider 1 120A and the data provider 2 120B.

The identity resolution and anonymization service 150 may be configured to obscure and/or remove any personally identifying information of the data corpora 122 prior to transmittal of the data corpora 122 to the data management system 160. In some implementations, the identity resolution and anonymization service 150 may associate the data of the data corpora 122 with an identifier through a process (e.g., a one-way process) such that information from two different data corpora 122 (data corpus 1 122A and data corpus 2 122B in this example) associated with a particular individual may be correlated with each other without revealing the identity of the particular individual. For example, the identity resolution and anonymization service 150 may anonymize and/or remove from the data corpora 122 names, physical addresses, Internet Protocol (IP) addresses, phone numbers, email addresses, credit records, billing information, etc. In some implementations, the identity resolution and anonymization service 150 may anonymize the data corpora 122 such that the anonymized identifier of a particular user is the same across each of the data corpora 122 in which the particular user's data appears. In some implementations, the identity resolution and anonymization service 150 may use a live random access memory (RAM) internal identification to generate the anonymized identifier.

In some implementations, the identity resolution and anonymization service 150 may attempt to protect personally identifiable information by being configured to act as a shared data space 152 with restricted access. In some implementations, the shared data space 152 may be configured as a "cleanroom." A data cleanroom may refer to an environment where some or all data is anonymized, processed and stored to be made available for measurement, or data transformations in a privacy-focused way. For example, two data providers 120 (data provider 1 120A and data provider 2 120B in this example) may desire to share their respective data corpora 122 with one another. The two data providers 120 may then enter into a contract to share data. Responsive to receiving a request from both data providers 120 to create a shared data space 152, the identity resolution and anonymization service 150 may create the shared data space 152. The shared data space 152 may be accessed using one or more of a service account and an encryption key. The shared data space 152 may include some or all of the respective data corpora 122 from both of the data providers 120. Access to the shared data space 152 may be restricted using the service account. A service account may refer to a specific account that has been created for the purpose of accessing a particular shared data space.

Additionally or alternatively, access to the shared data space 152 may be restricted using the encryption key. The encryption key, for example, may limit access only to those data providers 120 (e.g., data accessors 128 of those data providers 120) that have entered into a contract with one another. Further, an encryption key may only provide one-way access to the data providers 120 (e.g., accessors 128 of the data providers 120) that have access to the key. Additionally, an encryption key may be generated by Hash-based Message Authentication Code (HMAC), Advanced Encryption Standard (AES), Rivest-Shamir-Adleman (RSA), Triple Data Encryption Standard (TripleDES), or any other method for encrypting data. Data providers 120 that have an encryption key and access to a shared data space 152 may desire to have additional data providers 120 and their data corpora 122 joined to the shared data space 152.

In some implementations, in response to the query (e.g., query function) generated by the query generator 126 (with approval from both data providers 120A, 120B in this example), the identity resolution and anonymization service 150 creates the shared data space 152 as discussed above. In some implementations, in the shared data space 152, the data provider 1 120A (e.g., data accessor 1 128A) can obtain desire data (e.g., statistical data, data that can improve own data corpus 122) by executing the query (e.g., query function) on the data corpora 122 (e.g., some or all of the data corpus 1 122A and the data corpus 2 122B) from both of the data providers 120. As discussed, in some implementations, overlapped customer data of the data corpus 1 122A and the data corpus 2 122B can be used to improve own data (e.g., by capturing different attributes from the data corpus 2 122B and add to the data corpus 1 122A) or generates statistical data. Based on the calculation and/or logical calculation in the query (e.g., query function), different results can be obtained.

In some implementations, the systems provided herein may support asynchronous encryption in which each data provider 120 may use the same public key to encrypt their data corpus 122. Each data provider 120 may also receive their own compound private key. Only when the data enforcer 140 determines a data provider's data policy has been met will the data provider 120 be able to share their compound private key. In shared data scenarios, all of the data provider's compound private keys are shared with the data enforcer 140 before the data can be decrypted and accessed in the shared data space 152 by any of the data providers 120 (e.g., data accessors 128). This in effect enforcers all data rules 124 (e.g., data rules 1 124A, data rules 2 124B) are satisfied before any data can be decrypted and accessed by a data accessor 128.

In some implementations, the keys may be generated and managed by the identity resolution and anonymization service 150. Additionally or alternatively, the keys may be generated and managed by a separate encryption key management service. The identity resolution and anonymization service 150 (or separate encryption key management service) can be used to generate and secure explicit public keys and compound private keys for each report. Whichever entity generate and/or manages the key is referred to as a "key management service." In at least some implementations, the key management service may purge keys as soon as possible to minimize the possibility of a data breach.

Additionally, in some implementations, the data providers 120 may create their own secret private key as part of the data rules (124 (e.g., data rules 1 124A, data rules 2 124B). In this scenario, each data provider 120 only has access to its own private key that is needed for decryption. Each data provider 120 may then make a call to a shared anonymization service 150 to create an asynchronous encryption key that is then shared with another data provider(s) 120, such as the data provider 1 120A, and data provider 2 120B. This can be performed in a way such that the data provider specific secret private keys are encrypted during transit and during computation of the asynchronous encryption key. A confidential compute service may be used to ensure the secret data provider specific keys are never exposed to another entity unless all the data rules 124 have been satisfied. The asynchronous encryption key is then used to encrypt data corpus 1 122A, and data corpus 2 122B, before it can be searched, correlated, or processed through a predictive data model 168. In this example each data provider will share their portion of the compound decryption key to the anonymization service 150 after they are satisfied their data rules have been met by the data enforcer 140. Only once all compound encryption keys have been provided from each data provider (120 (e.g., data provider 1 120A, and data provider 2 120B) can the results of the search, correlation, or predictive data model get shared to the data accessor 128 (data accessor 1 128A in this example).

In some implementations, no single data provider 120 or data accessor 128 has all of the compound private keys needed to decrypt the report unless all data providers approve that their corresponding data policy rules have been met. In at least some implementations, no party will receive the public key and instead may rely on the encryption service to handle encryption. This is to have more granular control over the lifespan of a public key. The goal is to remove keys as soon as possible to prevent misuse of keys. For example we can purge the public key after all parties have marked their entry in the job table as 'data_available'. This may help prevent any party from using brute force to check well known values in encrypted dimensions.

The data management system 160 may be configured to receive the data corpora 122 from each of the data providers 120 and correlate the data corpora 122 with each other as the data corpora 162. In some implementations, the data management system 160 may obtain the data corpora 122 after the identity resolution and anonymization service 150 has anonymized any personally identifying information from the data corpora 122. In some implementations, the data corpora 162 may include an identification of the source of the data, i.e. whether a particular data corpus of the data corpora 162 came from data provider 1 120A, and/or data provider 2 120B. The data management system 160 may identify and correlate data associated with a user, or a group of users in the data corpora 162 and store the correlated data as a searchable record or index.

In some implementations, based on the query (e.g., query function generated by the query generator 126), the data management system 160 correlates the data corpora 122 using a identifier, such as a common value, or common join key, hashed email (HEM) address, user ID, or any other common key or join that can be matched, or a non-personally identifying identifier. For example, each of the data corpora 122 may include multiple groups of data, each group of data associated with a particular non-personally identifying identifier. As described above, the non-personally identifying identifiers may be generated by the identity resolution and anonymization service 150. The non-personally identifying identifiers may be generated in such a way that the same non-personally identifying identifier is generated for a group of data associated with a particular individual regardless of whether the group of data is in the data corpus 1 122A, or the data corpus 2 122B. The data management system 160 may thus correlate the data corpora by identifying a first group of data in the data corpus 1 122A associated with a particular non-personally identifying identifier, a second group of data in the data corpus 2 122B associated with the same particular non-personally identifying identifier, and then correlating the first group of data with the second group of data based on the query (e.g., query function generated by the query generator 126).

The data management system 160 may be configured to obtain the data rules 124 from each of the data providers 120 as the set of data rules 164. In some implementations, the set of data rules 164 may include an identification of the source of the data rules, i.e. whether particular data rules of the set of data rules 164 came from data provider 1 120A, and/or data provider 2 120B.

In some implementations, the data management system 160 may be configured to obtain the data management requirements 146 from the data enforcer 140 as the data management requirements 166.

In some implementations, the data management system 160 may be configured to process, verify, and/or validate search queries received from the data providers 120 (e.g., data accessor 128), and/or the data enforcer 140 to search the data corpora 162 using the set of data rules 164 and the data management requirements 166. In some implementations, the data management system 160 may be configured to process, verify, and/or validate queries (e.g., query function generated by the query generator 126) received from the data providers 120 (e.g., data accessor 128) to perform data operations discussed above on the data corpora 162 using the set of data rules 164 and the data management requirements 166.

In some implementations, the data management system 160 may also be configured to grant access to the data enforcer 140 to verify compliance with the data management requirements 166, to verify the contents of the data corpora 162.

In some implementations, the data management system 160 may be configured to generate a predictive data model 168 of the data corpora 162. The predictive data model 168 may be generated using machine learning and predictive analytics on the data corpora 162. For example, a generative adversarial network (GAN) or a privacy-preserving adversarial network (PPAN) may be applied to the data corpora 162 to generate the predictive data model 168 based on the data corpora 162. Additionally, the predictive data model 168 may be trained on the real data sets contained in the "virtual cleanroom" or shared data space 152, which may limit access to the predictive data model 168 to those data providers 120 (e.g., data accessor 128) that have an encryption key to the shared data space 152, and which may restrict data providers 120 from creating their own model on the actual data in the shared data space 152. The predictive data model 168 may be used for data providers 120 to predict behaviors, tendencies, and/or trends related to the data corpora 162 that is aggregated in the data management system 160. The predictive data model 168 may allow an individual data provider 120 a more accurate predictive model by combining data corpora 162 from more than one different data providers 120. Additionally, the predictive data model 168 may allow the shared data space 152 to maintain the privacy of the data corpora 162 by not allowing data providers 120 to develop their own predictive data models on the data corpora 162. For example, data provider 1 120A may provide data corpus 1 122A to a shared data space 152 and data provider 2 120B may provide data corpus 2 122B to the same shared data space 152. In some implementations, a predictive data model 168 may be generated on the combined data corpora 162 that data provider 1 120A and data provider 2 120B have contributed, without disclosing all the data to either of the data providers 120. The predictive data model 168 may be more accurate and complete than any one data provider 120 could develop on their own data corpora 122. In some implementations, a query (generated by the query generator 126) is executed on the data corpora 1 122A and the data corpora 2 122B in the shred data space 152.

In some implementations, a data provider 120 may enforce any security and/or data policies before allowing the data to be decrypted and leave the shared data space 152. Example security and/or data policies may include: ensuring raw row-level data shared into the shared data space 152 for a specific report has been purged, ensuring minimum bin/aggregation thresholds on specific dimensions have been met (e.g., the data management system 160 may model data that is below the minimum bin/aggregation thresholds and only extract the model or function coefficients when it cannot meet minimum bin/aggregation thresholds; e.g., the modeling can be a data science model, a machine learning model, an approximation function, or any non-deterministic function), ensuring that dimension sets can be used in a report, ensuring that dimension sets can be shared with a data accessor 128, ensuring that dimension values and corresponding metrics can be used in a report, ensuring that dimension values and corresponding metrics can be shared with a data accessor 128, ensuring that metrics are within valid ranges before sharing with a data accessor 128, ensuring that report types and use cases are authorized for each data accessor 128 and set of dimensions. For example, a data provider 120 may only allow its data to be used for measurement but not for forecasting or measurement for a specific data accessor 128 but not for another.

In some implementations, the execution engine is packaged, deployed, and installed separately from the queries and/or the query engine. The execution engine can maintain backwards compatibility with queries using sematic versioning and a manifest of which versions of an execution engine are compatible with a query. This allows for automated dependency checking and automated installation once an installation is approved.

Additions, deletions, and modifications may be made to the environment 100 of FIG. 1. In some implementations, the environment 100 may include more or fewer than two data providers 120. In some implementations, the environment 100 may not include the data enforcer 140 or may include multiple data enforcers 140. For example, in some implementations, the environment 100 may include multiple data enforcers 140 and each data enforcer 140 may correspond with a particular jurisdiction and may include data management requirements 146 associated with the particular jurisdiction.

In some implementations, the environment 100 may not include the identity resolution and anonymization service 150. In some implementations, each data provider 120 may perform its own data anonymization to remove personally identifying information from its respective data corpus 122. Alternatively or additionally, the data management system 160 may perform the removing of personally identifying information from the data corpora 122.

In some embodiments, each block in FIG. 1 can be built, deployed, installed, and maintained independently of the other blocks. In other instances the blocks may be combined to create composite blocks which can be built, deployed, installed, and maintained independently from the other blocks.

Figure 2A:
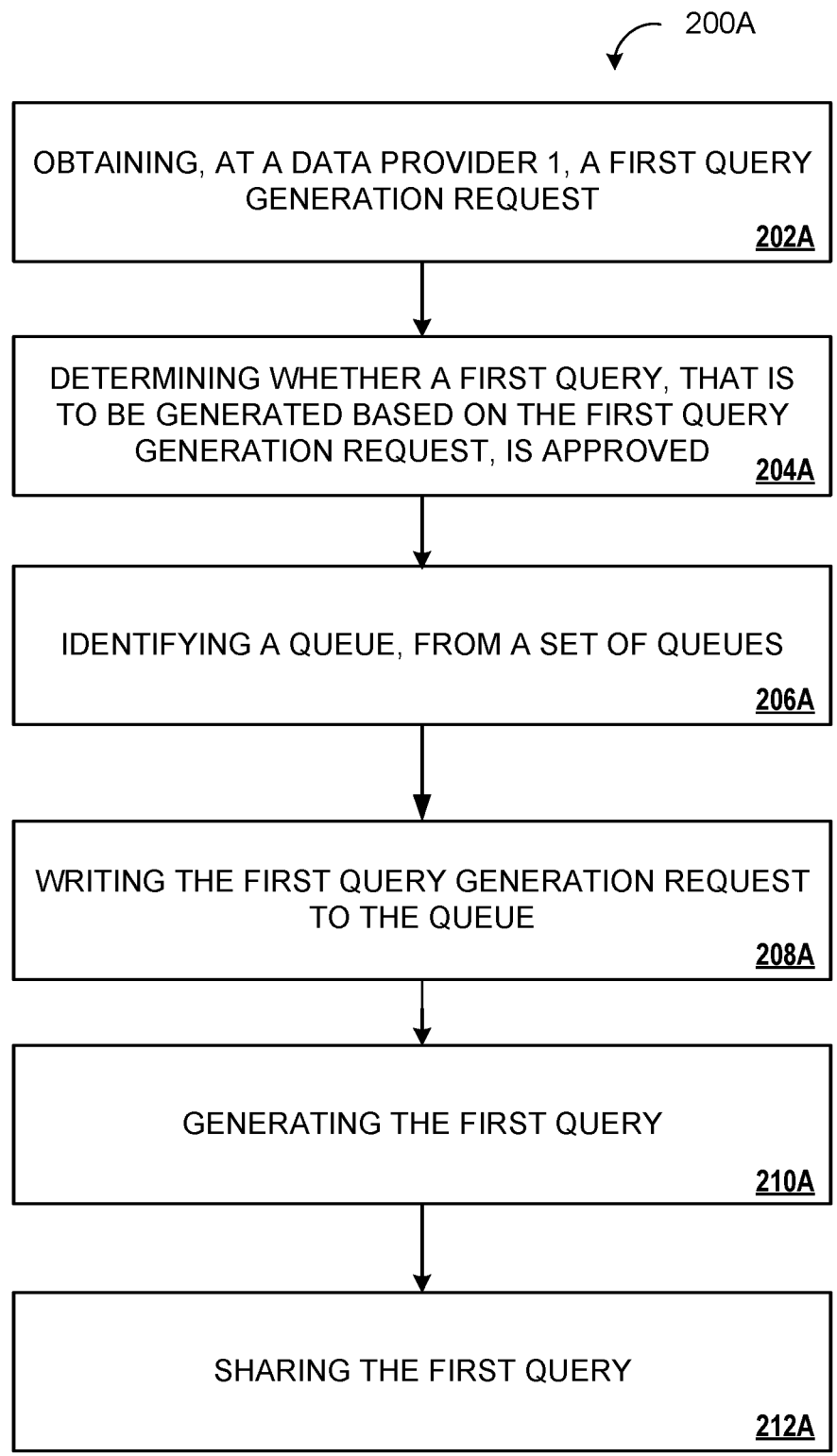
FIG. 2A illustrates a flowchart of an example method of generating a first query in accordance with some implementations of this disclosure.

FIG. 2A illustrates a flowchart of an example method 200A of generating a first query in accordance with some implementations of this disclosure. The method 200A may be performed by processing logic that may include hardware (circuitry, dedicated logic, processor(s), memory, etc.), software (such as is run on a general purpose computer system or a dedicated machine), or a combination of both, which processing logic may be included in any computer system (e.g., computing device 400 in FIG. 4) or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 200A, at operation 202A, includes obtaining, at a data provider 1 120A, a first query generation request. As discussed, in some implementations, the data provider 1 120A includes a query generator 1 126A which is configured to generate the first instruction or the set of first instructions (referred as query or query function). In some implementations, the query generator 1 126A (e.g., query function generator) is configured to obtain a first query generation request (e.g., query function generation request) and is configured to generate a first query (e.g., query function) that is configured to be executed on the data corpora 122 (data corpus 1 122A and data corpus 2 122B in this example) based on the first query generation request.

The method 200A, at operation 204A, includes determining whether the first query, that is to be generated based on the first query generation request, is approved (e.g., approved to access to relevant data corpus 122, pre-approved, pre-defined). For example, in response to obtaining the first query generation request (from a user of the data provider 1 120A in this example) that calls for generating the first query (e.g., query function) that is executable on the data corpus 1 122A (of the data provider 1 120A) and the data corpus 2 122B (of the data provider 2 120B), the query generator 1 126A determines whether the first query (e.g., query function) requested to be generated is approved or allowed by all of the data providers 120 associated with the data corpora 122 that the first query is configured to be executed on (data provider 1 120A and data provider 2 120B in this example). In some implementations, the query generator 1 126A determines whether the first query to be generated is approved or allowed based on data rules 1 124A of the data provider 1 120A and data rules 2 124B of the data provider 2 120B. For example, the first query (e.g., query function) to be generated may not be approved by the data rules 2 124B of the data provider 2 120B when the query to be generated needs an access to a subset of the data corpus 2 122B which is set as un-shareable in the data rules 2 124B. In some implementations, the query generator 1 126A of the data provider 1 120A determines whether the first query to be generated is approved or allowed based on the data rules 2 124B since, in a default setting, the first query (e.g., query function) generated by the query generator 1 126A has access to own data (the data corpus 1 122A of the data provider 1 120A in this example). Therefore, the query generator 1 126A does not need check with own rules (data rules 1 124A in this example) when the default setting (e.g., default rules in the data rules 1 124A) is implemented.

The method 200A, at operation 206A, includes identifying a queue, from a set of queues, to write the first query generation request to. In some implementations, there is one queue for all the query generation requests. In some implementations, there are more than one queue (also referred as a set of queues) for different query generation requests. For example, in some implementations, the set of queues includes a first queue for approved query generation requests (e.g., pre-defined query generation request, pre-approved query generation request) and a second queue for un-approved query generation requests.

The method 200A, at operation 208A, includes writing the first query generation request to the queue. For example, in some implementations, if the first query generation request is an approved query generation request, the query generator 126 (query generator 1 126A in this example) writes the approved first query generation request to the queue for the approved query generation requests. Similarly, in some implementations, if the first query generation request is a non-approved query generation request, the query generator 126 (query generator 1 126A in this example) writes the non-approved first query generation request to the queue for the non-approved query generation requests. In some implementations, the query generator 126 (query generator 1 126A in this example) submits a request for approval for the non-approved first query generation request while the non-approved first query generation request is in the queue for non-approved query generation requests. In some implementations, the set of queues resides in a private space of the data provider 120 (data provider 1 120A in this example).

As shown, in response to a determination that the first query, that is to be generated, is approved, the method 200A, at operation 210A, includes generating the first query. In some implementations, the query generator 126 (query generator 1 126A in this example) determines that the first query, that is to be generated, is approved when the first query generation request associated with the first query to be generated is in the queue for the approved query generation requests. In some implementations, the query generator 126 (query generator 1 126A in this example) generates and encapsulates the first query (e.g., query function) with a set of input parameters (e.g., start date, end date, advertiser, campaign, dimension set, network, daypart, platform, any combination thereof). In some implementations, the data providers 120 use the set of input parameters in the query to determine whether the query is an approved query. If it is determined that the query is a non-approved query, the query is not executable.

The method 200A, at operation 212A, includes sharing the generated first query with the data provider 2 120B. In some implementations, sharing the generated first query with the data provider 2 120B includes installing the first query at the data provider 2 120B. In some implementations, sharing the generated first query with the data provider 2 120B includes installing a first module including the first query at the data provider 2 120B. As discussed, the second query is executable on the data corpus 1 122A from the data provider 1 120A and the data corpus 2 122B from the data provider 2 120B.

Figure 2B:
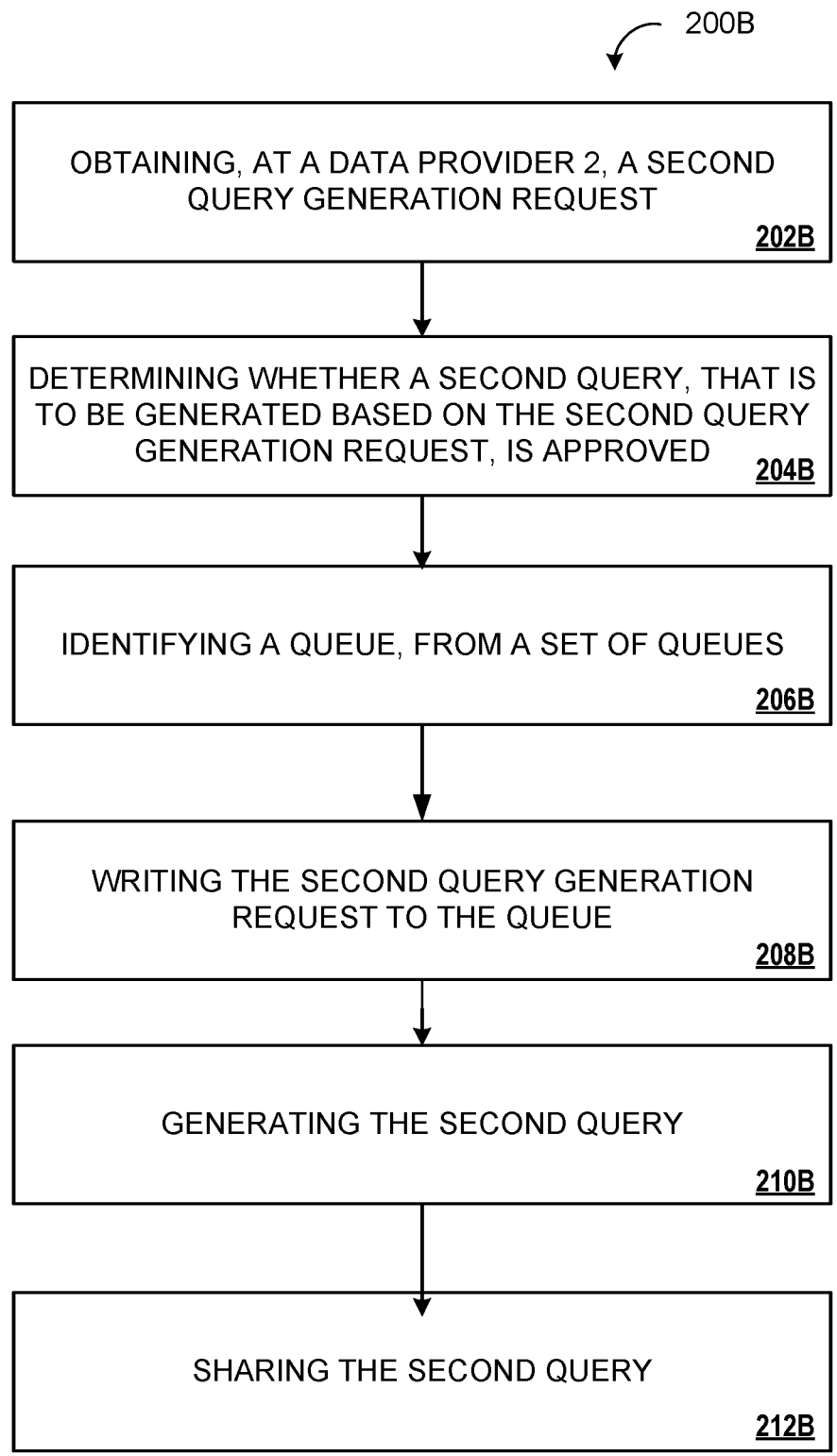
FIG. 2B illustrates a flowchart of an example method of generating a second query in accordance with some implementations of this disclosure.

FIG. 2B illustrates a flowchart of an example method 200B of generating a second query in accordance with some implementations of this disclosure. The method 200B may be performed by processing logic that may include hardware (circuitry, dedicated logic, processor(s), memory, etc.), software (such as is run on a general purpose computer system or a dedicated machine), or a combination of both, which processing logic may be included in any computer system (e.g., computing device 400 in FIG. 4) or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 200B, at operation 202B, includes obtaining, at a data provider 2 120B, a second query generation request. As discussed, in some implementations, the data provider 2 120B includes a query generator 2 126B which is configured to generate the second instruction or the set of second instructions (referred as query or query function). In some implementations, the query generator 2 126B (e.g., query function generator) is configured to obtain a second query generation request (e.g., query function generation request) and is configured to generate a second query (e.g., query function) that is configured to be executed on the data corpora 122 (data corpus 1 122A and data corpus 2 122B in this example) based on the second query generation request.

The method 200B, at operation 204B, includes determining whether the second query, that is to be generated based on the second query generation request, is approved (e.g., approved to access to relevant data corpus 122, pre-approved, pre-defined). For example, in response to obtaining the second query generation request (from a user of the data provider 2 120B in this example) that calls for generating the second query (e.g., query function) that is executable on the data corpus 1 122A (of the data provider 1 120A) and the data corpus 2 122B (of the data provider 2 120B), the query generator 2 126B determines whether the second query (e.g., query function) requested to be generated is approved or allowed by all of the data providers 120 associated with the data corpora 122 that the first query is configured to be executed on (data provider 1 120A and data provider 2 120B in this example). In some implementations, the query generator 2 126B determines whether the second query to be generated is approved or allowed based on data rules 1 124A of the data provider 1 120A and data rules 2 124B of the data provider 2 120B. For example, the second query (e.g., query function) to be generated may not be approved by the data rules 1 124A of the data provider 1 120A when the query to be generated needs an access to a subset of the data corpus 1 122A which is set as un-shareable in the data rules 1 124A. In some implementations, the query generator 2 126B of the data provider 2 120B determines whether the second query to be generated is approved or allowed based on the data rules 1 124A since, in a default setting, the second query (e.g., query function) generated by the query generator 2 126B has access to own data (the data corpus 2 122B of the data provider 2 120B in this example). Therefore, the query generator 2 126B does not need check with own rules (data rules 2 124B in this example) when the default setting (e.g., default rules in the data rules 2 124B) is implemented.

The method 200B, at operation 206B, includes identifying a queue, from a set of queues, to write the second query generation request to. In some implementations, there is one queue for all the query generation requests. In some implementations, there are more than one queue (also referred as a set of queues) for different query generation requests. For example, in some implementations, the set of queues includes a first queue for approved query generation requests (e.g., pre-defined query generation request, pre-approved query generation request) and a second queue for un-approved query generation requests.

The method 200B, at operation 208B, includes writing the second query generation request to the queue. For example, in some implementations, if the second query generation request is an approved query generation request, the query generator 126 (query generator 2 126B in this example) writes the approved second query generation request to the queue for the approved query generation requests. Similarly, in some implementations, if the second query generation request is a non-approved query generation request, the query generator 126 (query generator 2 126B in this example) writes the non-approved second query generation request to the queue for the non-approved query generation requests. In some implementations, the query generator 126 (query generator 2 126B in this example) submits a request for approval for the non-approved query second generation request while the non-approved second query generation request is in the queue for non-approved query generation requests. In some implementations, the set of queues resides in a private space of the data provider 120 (data provider 2 120B in this example).

As shown, in response to a determination that the second query, that is to be generated, is approved, the method 200B, at operation 210B, includes generating the second query. In some implementations, the query generator 126 (query generator 2 126B in this example) determines that the second query, that is to be generated, is approved when the second query generation request associated with the second query to be generated is in the queue for the approved query generation requests. In some implementations, the query generator 126 (query generator 2 126B in this example) generates and encapsulates the second query (e.g., query function) with a set of input parameter (e.g., start date, end date, advertiser, campaign, dimension set, network, daypart, platform, any combination thereof).

The method 200B, at operation 212B, includes sharing the generated second query with the data provider 1 120A. In some implementations, sharing the generated second query with the data provider 1 120A includes installing the second query at the data provider 1 120A. In some implementations, sharing the generated second query with the data provider 1 120A includes installing a second module including the second query at the data provider 1 120A. As discussed, the second query is executable on the data corpus 1 122A from the data provider 1 120A and the data corpus 2 122B from the data provider 2 120B.

As shown in FIG. 2A and FIG. 2B, in some implementations, the data provider 1 120A and the data provider 2 120B have a symmetric relationship. For example, the data provider 1 120A is configured to generate a first query (e.g., query function) that can be executable on the data corpus 1 112A of the data provider 1 120A and the data corpus 2 112B of the data provider 2 120B. Similarly, the data provider 2 120B is configured to generate a second query (e.g., query function) that can be executable on the data corpus 1 112A of the data provider 1 120A and the data corpus 2 112B of the data provider 2 120B. Also, the first query (e.g., query function) generated by the data provider 1 120A can be executed by the data provider 1 120A and the data provider 2 120B. Similarly, the second query (e.g., query function) generated by the data provider 2 120B can be executed by the data provider 1 120A and the data provider 2 120B.

Figure 3A:
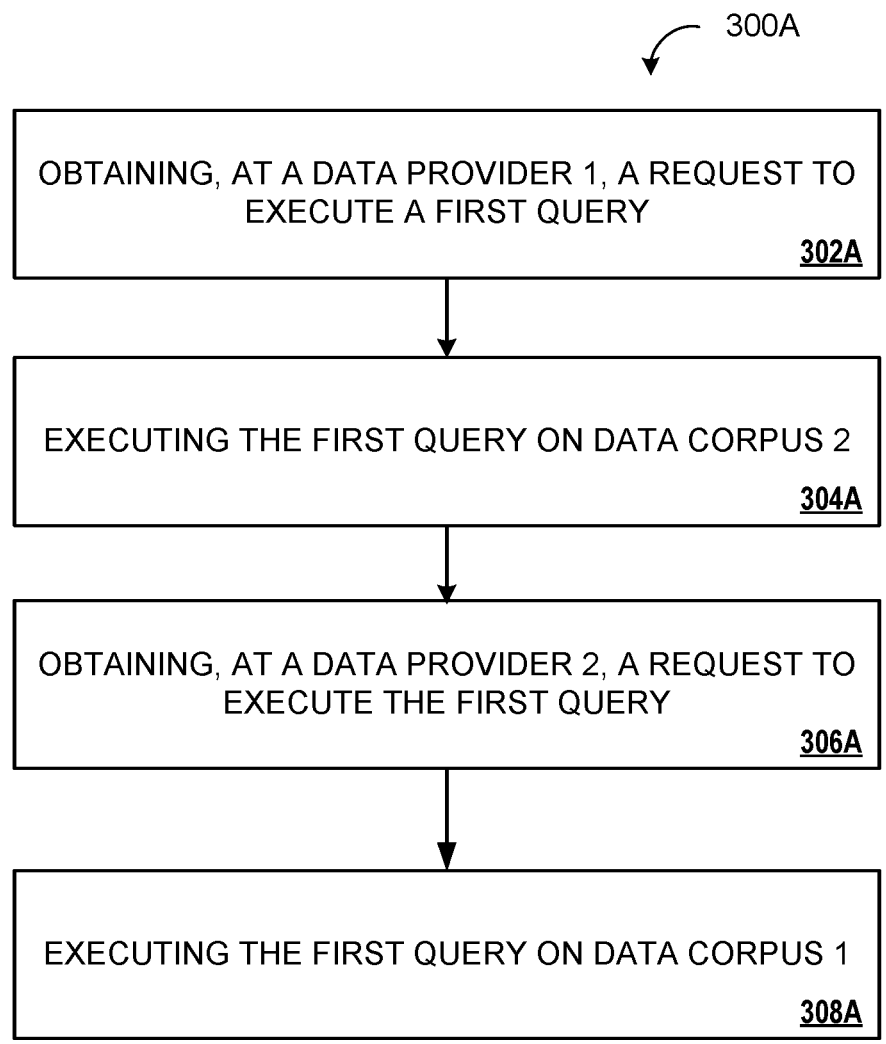
FIG. 3A illustrates a flowchart of an example method of executing a first query in accordance with some implementations of this disclosure.

FIG. 3A illustrates a flowchart of an example method 300A of executing a first query in accordance with some implementations of this disclosure. The method 300A may be performed by processing logic that may include hardware (circuitry, dedicated logic, processor(s), memory, etc.), software (such as is run on a general purpose computer system or a dedicated machine), or a combination of both, which processing logic may be included in any computer system (e.g., computing device 400 in FIG. 4) or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 300A, at operation 302A, includes obtaining, at the data provider 1 120A, a request to execute the first query (e.g., query function). As discussed, in some implementations, the data accessor 1 128A of the data provider 1 120A is configured to obtain or receive a request to execute the first query of FIG. 2A (e.g., query function) by a user (e.g., same user who requested the first query generation request).

In response to obtaining the request to execute the first query, the method 300A, at operation 304A, includes executing the first query (e.g., query function) on the data corpus 2 122B from the data provider 2 120B. In some implementation, in response to obtaining the request to execute the first query, the method 300A, at operation 304A, includes executing the first query (e.g., query function) on the data corpus 1 122A from the data provider 1 120A and the data corpus 2 122B from the data provider 2 120B.

The method 300A, at operation 306A, includes obtaining, at the data provider 2 120B, a request to execute the first query (e.g., query function). As discussed, in some implementations, the data accessor 2 128B of the data provider 2 120B is configured to obtain or receive a request to execute the first query of FIG. 2A (e.g., query function) by a user.

In response to obtaining the request to execute the first query, the method 300A, at operation 308A, includes executing the first query (e.g., query function) on the data corpus 1 122A from the data provider 1 120A. In some implementation, in response to obtaining the request to execute the first query, the method 300A, at operation 308A, includes executing the first query (e.g., query function) on the data corpus 1 122A from the data provider 1 120A and the data corpus 2 122B from the data provider 2 120B.

For example, the first query (which is generated by the data provider 1 120A) is a query function (approved by the data provider 1 120A and the data provider 2 120B) to determine a number of customers in a data corpus 122. As described above, a user of the data provider 1 can execute the first query on the data corpus 2 122B in a clean room environment to determine a number of (data provider 2) customers in the state of California. Similarly, a user of the data provider 2 can execute the first query on the data corpus 1 122A in the clean room environment to determine a number of (data provider 1) customers in the state of California.

For another example, the first query (which is generated by the data provider 1 120A) is a query function (approved by the data provider 1 120A and the data provider 2 120B) to determine a number of common customers between the data provider 1 120A and the data provider 2 120B. As described above, a user of the data provider 1 can execute the first query on the data corpus 1 122A and the data corpus 2 122B in the clean room environment to determine the number of common customers. Similarly, a user of the data provider 2 can execute the first query on the data corpus 1 122A and the data corpus 2 122B in the clean room environment to determine the number of common customers.

Figure 3B:
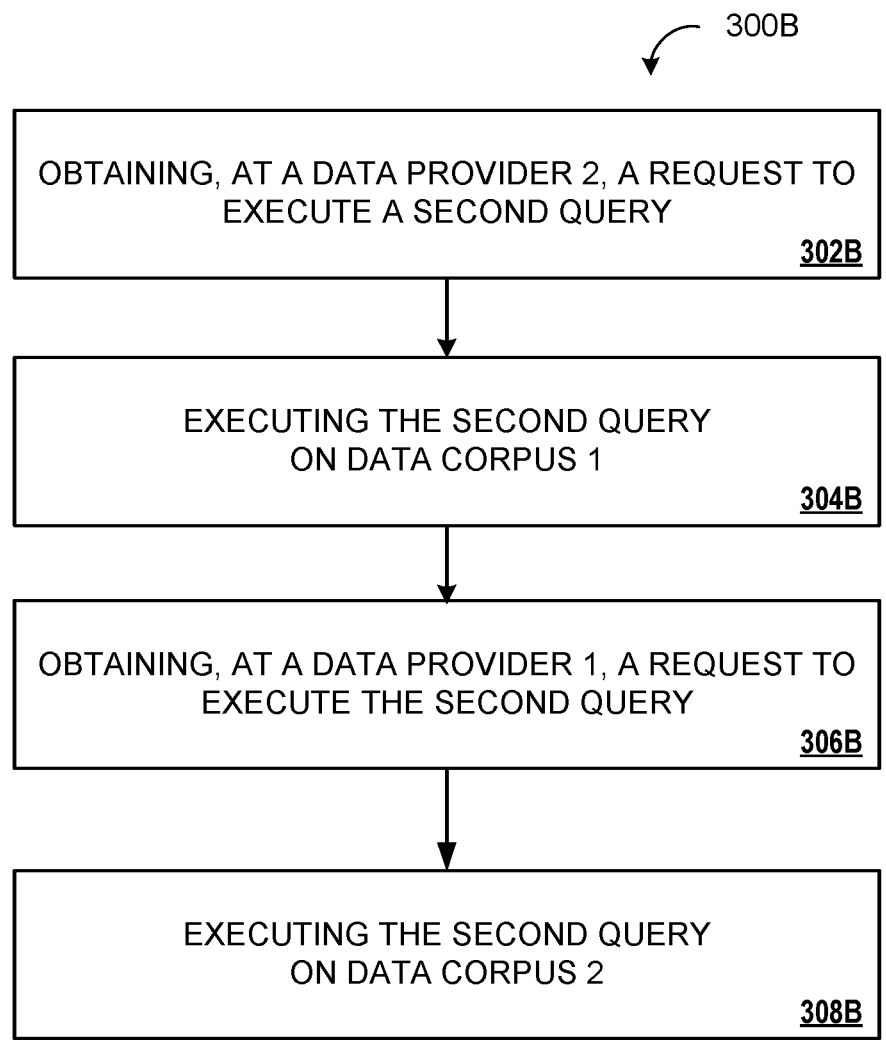
FIG. 3B illustrates a flowchart of an example method of executing a second query in accordance with some implementations of this disclosure.

FIG. 3B illustrates a flowchart of an example method 300B of executing a second query in accordance with some implementations of this disclosure. The method 300B may be performed by processing logic that may include hardware (circuitry, dedicated logic, processor(s), memory, etc.), software (such as is run on a general purpose computer system or a dedicated machine), or a combination of both, which processing logic may be included in any computer system (e.g., computing device 400 in FIG. 4) or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method 300B, at operation 302B, includes obtaining, at the data provider 2 120B, a request to execute the second query (e.g., query function). As discussed, in some implementations, the data accessor 1 128B of the data provider 2 120B is configured to obtain or receive a request to execute the second query of FIG. 2B (e.g., query function) by a user (e.g., same user who requested the first query generation request).

In response to obtaining the request to execute the second query, the method 300B, at operation 304B, includes executing the second query (e.g., query function) on the data corpus 1 122A from the data provider 1 120A. In some implementation, in response to obtaining the request to execute the second query, the method 300B, at operation 304B, includes executing the second query (e.g., query function) on the data corpus 1 122A from the data provider 1 120A and the data corpus 2 122B from the data provider 2 120B.

The method 300B, at operation 306B, includes obtaining, at the data provider 1 120A, a request to execute the second query (e.g., query function). As discussed, in some implementations, the data accessor 1 128A of the data provider 1 120A is configured to obtain or receive a request to execute the second query of FIG. 2B (e.g., query function) by a user.

In response to obtaining the request to execute the second query, the method 300B, at operation 308B, includes executing the second query (e.g., query function) on the data corpus 2 122B from the data provider 2 120B. In some implementation, in response to obtaining the request to execute the second query, the method 300B, at operation 308B, includes executing the second query (e.g., query function) on the data corpus 1 122A from the data provider 1 120A and the data corpus 2 122B from the data provider 2 120B.

As illustrated in FIG. 3A and FIG. 3B, in some implementations, the first query (e.g., query function) generated by the data provider 1 120A can be shared with the data provider 2 120B. Similarly, the second query (e.g., query function) generated by the data provider 2 120B can be shared with the data provider 1 120A.

Figure 4:
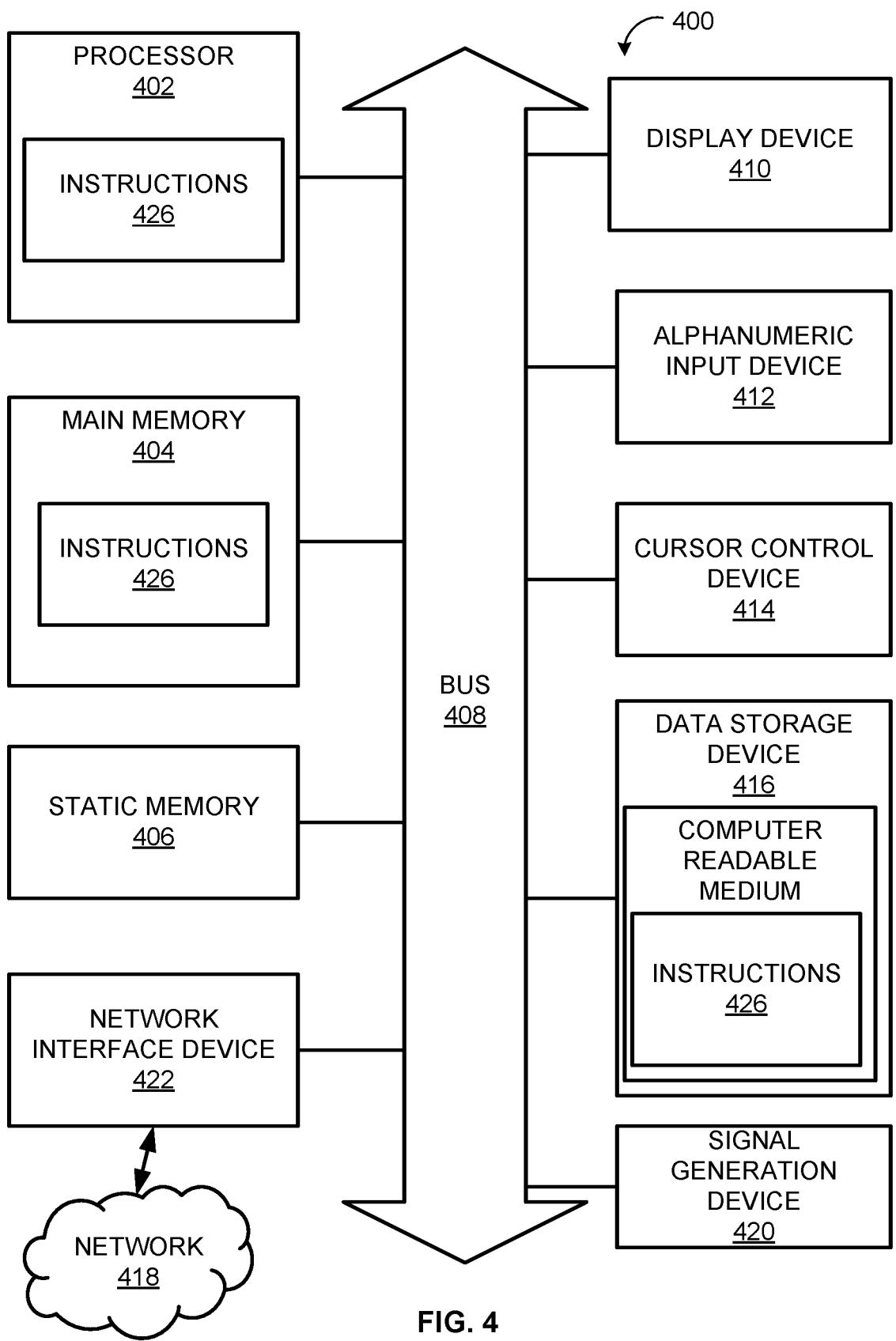
FIG. 4 illustrates an example computing device that may be used for generating and/or executing a query in accordance with some implementations of this disclosure.

FIG. 4 illustrates a diagrammatic representation of a machine in the example form of a computing device 400 within which a set of instructions, for causing the machine to perform any one or more of the methodologies discussed herein, may be executed. The computing device 400 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a PC, a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 400 includes a processing device (e.g., a processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)) and a data storage device 416, which communicate with each other via a bus 408.

Processing device 402 represents one or more processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein.

The computing device 400 may further include a network interface device 422 which may communicate with a network 418. The computing device 400 also may include a display device 410 (e.g., a liquid crystal display (LCD) or a cathode ray tube (CRT)), an alphanumeric input device 412 (e.g., a keyboard), a cursor control device 414 (e.g., a mouse) and a signal generation device 420 (e.g., a speaker). In one implementation, the display device 410, the alphanumeric input device 412, and the cursor control device 414 may be combined into a single component or device (e.g., an LCD touch screen).

The data storage device 416 may include a computer-readable storage medium 424 on which is stored one or more sets of instructions 426 embodying any one or more of the methodologies or functions described herein. The instructions 426 may also reside, completely or at least partially, within the main memory 404 and/or within the processing device 402 during execution thereof by the computing device 400, the main memory 404 and the processing device 402 also constituting computer-readable media. The instructions may further be transmitted or received over a network 418 via the network interface device 422.

While the computer-readable storage medium 424 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "obtaining," "correlating," "determining," "validating," "receiving," "generating," "transforming," "requesting," "creating," "uploading," "adding," "presenting," "removing," "preventing," "providing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a computer selectively activated or reconfigured by a computer program stored in the computer. Such a computer program may be stored in a non-transitory computer readable storage medium, such as, but not limited to, any type of disk including floppy disks, optical disks, compact disc read-only memories (CD-ROMs) and magnetic-optical disks, ROMs, RAMs, erasable programmable read-only memories (EPROMs), electrically erasable programmable read-only memories (EEPROMs), magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

What is claimed is:

1. A method, comprising:
   obtaining, via a first data provider, a first query generation request;
   determining whether a first query, that is to be generated based on the first query generation request, is approved;
   in response to a determination that the first query, that is to be generated, is approved, generating the first query;
   sharing the generated first query with a second data provider,
   wherein the first query is executable on a first data corpus from the first data provider and a second data corpus from the second data provider,
   obtaining, via the second data provider, a second query generation request;
   determining whether a second query, that is to be generated based on the second query generation request, is approved;
   in response to a determination that the second query, that is to be generated, is approved, generating the second query; and
   sharing the generated second query with the first data provider, wherein the first query generation request is to be submitted for an approval responsive to the first query that is to be generated not being approved.

2. The method of claim 1, the method further comprising:
in response to a determination that the second query, that is to be generated, is un-approved, submitting the second query generation request for an approval.

3. The method of claim 1, the method further comprising:
obtaining, via the first data provider, a request to execute the first query; and
in response to obtaining the request to execute the first query, executing the first query on the second data corpus from the second data provider, the executed first query at the second data provider.

4. The method of claim 2, the method further comprising:
obtaining, via the second data provider, a request to execute the second query; and
in response to obtaining the request to execute the second query, executing the second query on the first data corpus from the first data provider, the executed second query at the first data provider.

5. The method of claim 1, the method further comprising:
obtaining, via the second data provider, a request to execute the first query; and
in response to obtaining the request to execute the first query, executing the first query on the first data corpus from the first data provider.

6. The method of claim 1, the method further comprising:
obtaining, via the first data provider, a request to execute the second query; and
in response to obtaining the request to execute the second query, executing the second query on the second data corpus from the second data provider.

7. The method of claim 1, the method further comprising:
identifying a first queue, from a set of queues, to write the first query generation request to; and
writing the first query generation request to the first queue.

8. The method of claim 7, wherein the set of queues resides in a private space of the first data provider.

9. The method of claim 1, wherein generating the first query includes encapsulating the first query with a set of input parameter.

10. The method of claim 1, wherein sharing the first query with the second data provider includes:
causing an installation of a first module at the second data provider, the first module including the first query.

11. The method of claim 1, wherein the first query includes an operation instruction or a set of operation instructions performable on the first data corpus and the second data corpus.

12. A system, comprising
one or more processors; and
one or more computer-readable media configured to store instructions that in response to being executed by the one or more processors cause the system to perform operations, the operations comprising:
obtaining, via a first data provider, a first query generation request;
determining whether a first query, that is to be generated based on the first query generation request, is approved;
in response to a determination that the first query, that is to be generated, is approved, generating the first query; and
sharing the generated first query with a second data provider,
wherein the first query is executable on a first data corpus from the first data provider and a second data corpus from the second data provider,
in response to a determination that the first query, that is to be generated, is un-approved, submitting the first query generation request for an approval,
wherein a second query is executable on the first data corpus from the first data provider and the second data corpus from the second data provider.

13. The system of claim 12, the operations further comprising:
obtaining, via the second data provider, a second query generation request;
determining whether a second query, that is to be generated based on the second query generation request, is approved;
in response to a determination that the second query, that is to be generated, is approved, generating the second query; and
sharing the generated second query with the first data provider.

14. The system of claim 13, the operations further comprising:
in response to a determination that the second query, that is to be generated, is un-approved, submitting the second query generation request for an approval.

15. The system of claim 12, the operations further comprising:
obtaining, via the first data provider, a request to execute the first query; and
in response to obtaining the request to execute the first query, executing the first query on the second data corpus from the second data provider, the executed first query at the second data provider.

16. The system of claim 13, the operations further comprising:
obtaining, via the second data provider, a request to execute the second query; and
in response to obtaining the request to execute the second query, executing the second query on the first data corpus from the first data provider, the executed second query at the first data provider.

17. The system of claim 12, the operations further comprising:
obtaining, via the second data provider, a request to execute the first query; and
in response to obtaining the request to execute the first query, executing the first query on the first data corpus from the first data provider.

18. The system of claim 13, the operations further comprising:
obtaining, via the first data provider, a request to execute the second query; and
in response to obtaining the request to execute the second query, executing the second query on the second data corpus from the second data provider.

19. The system of claim 12, the operations further comprising:
identifying a first queue, from a set of queues, to write the first query generation request to; and
writing the first query generation request to the first queue.

20. The system of claim 19, wherein the set of queues resides in a private space of the first data provider.

21. The system of claim 12, wherein generating the first query includes encapsulating the first query with a set of input parameter.

22. The system of claim 12, wherein sharing the first query with the second data provider includes:
   causing an installation of installing a first module at the second data provider, the first module including the first query.

23. The system of claim 12, wherein the first query includes an operation instruction or a set of operation instructions performable on the first data corpus and the second data corpus.

* * * * *